United States Patent [19]

Cheng

[11] 4,213,340

[45] Jul. 22, 1980

[54] OIL-WATER INTERFACIAL DETECTOR

[76] Inventor: Sheng-Hsiung Cheng, P.O. Box 17092, West Hartford, Conn. 06117

[21] Appl. No.: 960,306

[22] Filed: Nov. 13, 1978

[51] Int. Cl.³ ............................................. G01F 23/24
[52] U.S. Cl. .................................. 73/304 R; 340/620
[58] Field of Search ............................ 73/304; 340/620

[56] References Cited

U.S. PATENT DOCUMENTS

| 2,202,197 | 5/1940 | Ewertz | 73/304 R |
| 3,772,531 | 11/1973 | Webb | 73/304 R |
| 3,787,733 | 1/1974 | Peters | 340/620 |
| 3,790,936 | 2/1974 | Knoll | 340/620 |
| 4,169,377 | 10/1979 | Sheib | 73/304 R |

Primary Examiner—S. Clement Swisher

[57] ABSTRACT

An electrical instrument for detecting an interface between oil and water in a tank or other area; the instrument having an electrical circuit that includes a conductor to a lower-most probe and another conductor for selective connection to a series of probes at different elevations.

3 Claims, 2 Drawing Figures

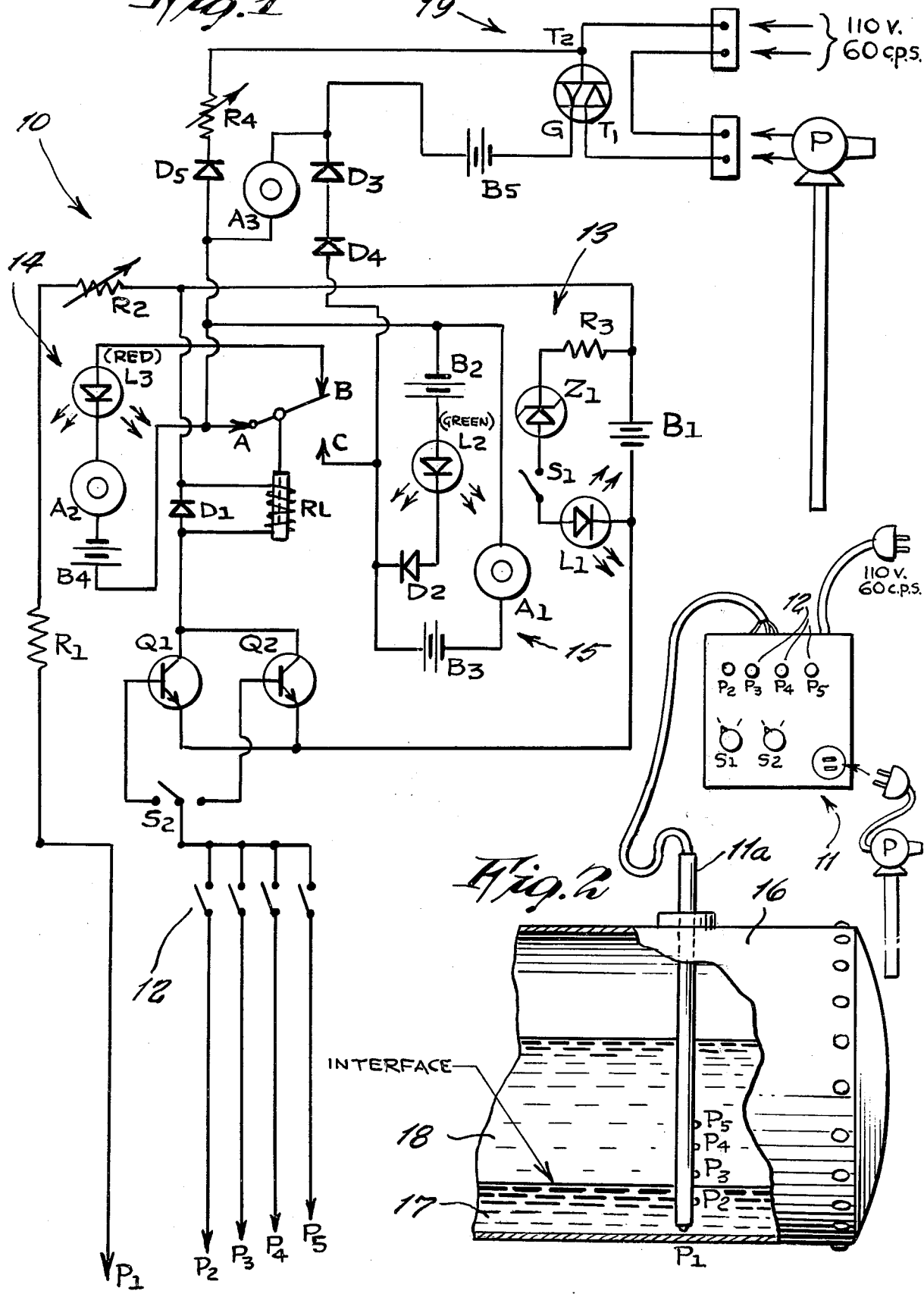

OIL-WATER INTERFACIAL DETECTOR

This invention relates to an oil-water interfacial detector.

A principal object of the present invention is to provide an instrument for detecting the presence of an interface between an aqueous liquid such as water and an oily liquid such as gasoline, particularly inside a storage tank.

Another object is to provide an oil-water interfacial detector that is adaptable to numerous specific applications, such as, for example: (1) detecting water spill on a floor, (2) detecting underground water leakage from a pipe, (3) detecting water contamination inside an oil tank, (4) detecting leakage from a steam trap, (5) detecting water overflow from a tank, (6) detecting presence of water in organic solvent, (7) detecting water formation in a chemical reaction, (8) protect instruments from water damage, (9) use as a water level indicator, (10) use as a water boiling off alarm, (11) use as a prescorching alarm, (12) use as a water pump controller, (13) use as a switch for controlling a pump or fan, (14) use as a fish biting alarm, and (15) use as an alarm for objects falling into a water.

Other objects are to provide an oil-water interfacial detector which is simple in design, inexpensive to manufacture, rugged in construction, easy to use, and efficient in operation.

These and other objects will be readily evident upon a study of the following specification, and the accompanying drawing, wherein:

FIG. 1 is an electrical circuit diagram of the present invention.

FIG. 2 is a side view, illustrating one example of the invention in operative use relative to a tank.

Reference is now made to the drawing in greater detail wherein there is shown an electric circuit 10 of an oil-water interfacial detector instrument 11, and a dip stick 11a attached thereto.

In the circuit, an NPN (or PNP) transistor is used to amplify a current; when a base lead of the transistor Q1 or Q2 forms a closed circuit through a series of resistors and in a presence of water between two probes $P_1$, and either one of probes $P_2$, $P_3$, $P_4$ and $P_5$. The resulting current flowing through a collector-emitter junction will be sufficient to activate a relay RL to perform a specific warning and switching functions.

When there is a presence of water between $P_1$ and any one of the other probes $P_2$ to $P_5$, a green LED (light emitting diode) $L_2$ lights up, and an alarm A is sounded.

The probes are spaced vertically apart, such as for example at ⅛ inch increments so the instrument will detect interfacial changes at each ⅛ inch elevation level. By depressing the probe individual switches 12, one at a time, each probe can be checked if it is electrically engaged with the probe $P_1$.

The resistors $R_1$ and $R_2$ serve to control the detector sensitivity.

The transistors Q1 and Q2 are connected in parallel and are interchangeable at the time of operation. These comprise general purpose NPN or PNP transistors for current amplification. In case of a PNP transistor, the connection of battery leads should be reversed accordingly.

The diode $D_1$ serves to prevent a voltage surge during a collapsing field in the relay RL, and to protect transistors $Q_1$ and $Q_2$.

The diode $D_2$ serves to prevent LED $L_2$ from being turned on prematurely in the presence of battery $B_3$ for the alarm $A_1$.

A voltage test device 13, comprised of a resistor $R_3$, a normally open push type switch $S_1$, a Zener diode $Z_1$ of 6 volts and an LED $L_1$ serves to check the operating voltage of the transistor circuit. If $L_1$ is on, when the switch $S_1$ is pressed, the voltage is at least 6 volts so to be suitable for operation.

The different level of probes provides a suitable gap for monitoring the presence of an oil layer over a water surface. If such presence is detected, the relay RL will activate a warning alarm $A_2$ and light up a red LED $L_3$. Thus the circuit portion 14 that includes $L_3$, $A_2$ and battery $B_4$ serves to detect oil presence. The circuit portion 14 also serves as a prescorch warning.

The circuit portion 15 that includes $A_1$ and $B_3$ serves to detect the presence of the water.

In FIG. 2, an example is shown using the instrument on a tank 16 containing water 17 and oil 18.

When water is present between probe $P_1$ and any one of the probes $P_2$ to $P_5$, the relay RL is thus activated, due to the relay contact arm engaging the contact C and lighting up green LED $L_2$.

For the detection of oil-water interface and prescorch point, the circuit portion 15 is not needed for sounding the alarm $A_1$, when water is initially present between probe $P_1$ and any one of probes $P_2$ to $P_5$.

If a layer of oil covers the water surface, then the relay becomes inactivated, due to the relay contact arm being shifted from contact point C to point B, thus connecting points A and B together. Thus the red LED $L_3$ lights up and alarm $A_2$ is sounded to warn the presence of the oil or other electrically non-conductive substance between probe $P_1$ and a selected of probes $P_2$ to $P_5$.

If the oil layer on the water surface is removed, then the relay contact arm will move back between points A and C, so that green LED $L_2$ lights up again.

In detecting the prescorch point, the relay RL is essentially used the same as when there is a presence of oil, however, water must be present first. If plenty of water is present between probe $P_1$ and a selected probe $P_2$ to $P_5$ before boiling off, then the relay is activated by the water, making contacts A and C connected and green LED $L_2$ to be on.

In case the water is completely boiled off, or water level drops below $P_2$, then an air gap occurs between $P_1$ and $P_2$, breaking the circuit and inactivating the relay so that the relay arm shifts from contacts A and C to contacts A and B, and at a same time light up the red LED $L_3$ and sounds alarm $A_2$.

In case removal of water is necessary for a safety reason, an attachment circuit 19, having a triac Ti (100 volts, 6 amp. range) and diodes $D_3$, $D_4$ and $D_5$, is connected to points A and C of the relay RL. A pump P is connected to circuit 19 for pumping up the water. Upon completion of water removal, the pump automatically stops to run and the alarm $A_3$ stops sounding.

I claim:

1. An oil-water interfacial detector, comprising in combination, an instrument including a dip stick attached thereto; said instrument including therein an electrical circuit that has a first portion of said circuit for detecting a water presence below an interface, and a second circuit portion for detecting an oil presence above said interface; said electrical circuit additionally including an attached portion for connection to a pump for pumping out either said water or said oil; said dip stick including a first probe at its lowermost end connected by a first conductor to said circuit, and a plurality of probes vertically spaced apart from each other and said first probe, all said probes protruding from a same side of said dip stick, said plurality of probes each being selectively connected by an individual switch to a second conductor and to said circuit; said circuit including a relay having a contact arm that shifts between a first contact point and a second contact point, said first contact point being in said first circuit portion which includes a green lamp, an alarm and a power source, and said second contact point being in a second said circuit portion which includes a red lamp, an alarm and a power source, said first circuit portion being closed by presence of water between two said probes, and said second circuit portion being closed by presence of electrically non-conductive liquid such as oil between two said probes.

2. The combination as set forth in claim 1, wherein a boil-off of water below an oil, and a prescorch is detected by said relay arm being shifted from said second contact and to said first contact point and light up said green lamp.

3. The combination as set forth in claim 2, wherein an air gap between a lowest two said probes caused by a complete water boil-off is detected by a shift of said relay arm to said second contact point and light up said red lamp.

* * * * *